(12) United States Patent
Enke

(10) Patent No.: US 12,077,292 B2
(45) Date of Patent: *Sep. 3, 2024

(54) SYNCHRONIZED PIPELINE FLIGHT CONTROLLER

(71) Applicant: GoPro, Inc., San Mateo, CA (US)

(72) Inventor: Joseph Anthony Enke, Campbell, CA (US)

(73) Assignee: GoPro, Inc., San Mateo, CA (US)

( * ) Notice: Subject to any disclaimer, the term of this patent is extended or adjusted under 35 U.S.C. 154(b) by 826 days.

This patent is subject to a terminal disclaimer.

(21) Appl. No.: 17/183,212

(22) Filed: Feb. 23, 2021

(65) Prior Publication Data

US 2021/0245877 A1 Aug. 12, 2021

Related U.S. Application Data

(63) Continuation of application No. 16/382,286, filed on Apr. 12, 2019, now Pat. No. 10,953,983, which is a
(Continued)

(51) Int. Cl.
*B64C 39/02* (2023.01)
*B64U 10/13* (2023.01)
(Continued)

(52) U.S. Cl.
CPC ............ *B64C 39/02* (2013.01); *B64C 39/024* (2013.01); *G05D 1/0088* (2013.01); *B64U 10/13* (2023.01); *B64U 2101/30* (2023.01); *H04L 67/12* (2013.01)

(58) Field of Classification Search
CPC .... B64C 39/02; B64C 39/024; G05D 1/0088; B64U 10/13; B64U 2101/30; B64U 10/14;
(Continued)

(56) References Cited

U.S. PATENT DOCUMENTS 10,268,210 B2 4/2019 Enke
10,953,983 B2 3/2021 Enke
(Continued)

FOREIGN PATENT DOCUMENTS

WO 2016061726 A1 4/2016

OTHER PUBLICATIONS

Chan et al., Sensor Data Fusion for Attitude Stabilization in a Low Cost Quadrotor System, Jun. 2011, 2011 IEEE 15th International Symposium on Consumer Electronics (Year: 2011) 6 pages.
(Continued)

*Primary Examiner* — Anshul Sood
(74) *Attorney, Agent, or Firm* — Young Basile Hanlon & MacFarlane, P.C.

(57) ABSTRACT

A pipeline in a controller may be configured to interface between sensors and actuators. The pipeline may elements such as drivers, filters, a combine, estimators, controllers, a mixer, and actuator controllers. The drivers may receive sensor data and pre-process the received sensor data. The filters may filter the pre-processed sensor data to generate filtered sensor data. The combine may package the filtered sensor data to generate packaged sensor data. The estimators may determine estimates of a position of a vehicle based on the packaged sensor data. The controllers may generate control signals based on the determined estimates. The mixer may modify the generated control signals based on limitations of the vehicle. The actuator controllers may generate actuator control signals based on the modified control signals to drive the actuators.

20 Claims, 6 Drawing Sheets

Related U.S. Application Data continuation of application No. 15/268,447, filed on Sep. 16, 2016, now Pat. No. 10,268,210.

(51) Int. Cl.
*B64U 101/30* (2023.01)
*G05D 1/00* (2006.01)
*H04L 67/12* (2022.01)

(58) Field of Classification Search
CPC ........ B64U 20/87; B64U 30/21; B64U 50/19; B64U 50/39; B64U 70/90; H04L 67/12
See application file for complete search history.

(56) References Cited

U.S. PATENT DOCUMENTS

| | | | |
|---|---|---|---|
| 2002/0120663 A1* | 8/2002 | Binns | G06F 9/4887 718/103 |
| 2013/0173088 A1 | 7/2013 | Callou | |
| 2015/0280919 A1 | 10/2015 | Cullen | |
| 2016/0070264 A1 | 3/2016 | Hu | |
| 2017/0068252 A1 | 3/2017 | Yu | |
| 2017/0222594 A1 | 8/2017 | Tao | |
| 2018/0081353 A1 | 3/2018 | Enke | |
| 2019/0235530 A1 | 8/2019 | Enke | |

OTHER PUBLICATIONS

Corner, 'Computer Organization', 2006, Computer Science Department, Purdue University [online] <URL: https://www.eecs.wsu.edu/-hauser/teaching/Arch-F07/handouts/Chapter18.pdf> (Year: 2006) 36 pg.

FOLDOC (Free On-Line Dictionary of Computing), 'Pipeline', 1996, Free On-Line Dictionary of Computing [online] <URL: http://foldoc.org/pipeline> (Year: 1996) 1 pg.

Wikipedia, Kalman Filter, Sep. 15, 2015, Wikipedia Online Encyclopedia (Year: 2015) 30 pages.

\* cited by examiner

SYNCHRONIZED PIPELINE FLIGHT CONTROLLER

CROSS REFERENCE TO RELATED APPLICATION(S)

This application is a continuation of U.S. patent application Ser. No. 16/382,286, filed Apr. 12, 2019, which is a continuation of U.S. patent application Ser. No. 15/268,447, filed on Sep. 16, 2016, now U.S. Pat. No. 10,268,210, the entire disclosures of which are hereby incorporated by reference.

TECHNICAL FIELD

The disclosure generally relates to the field of flight controller systems, for example, synchronized pipelines in flight controller systems.

BACKGROUND

A controller system, such as a flight controller system, may interface with one or more sensors and one or more actuators. Typical controller systems operate at a system frequency and asynchronously poll sensor data from the sensors and asynchronously write to/drive the actuators.

The controller system may include one or more modules. An execution time of each module and an order of execution of the modules may affect the performance of the controller system.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
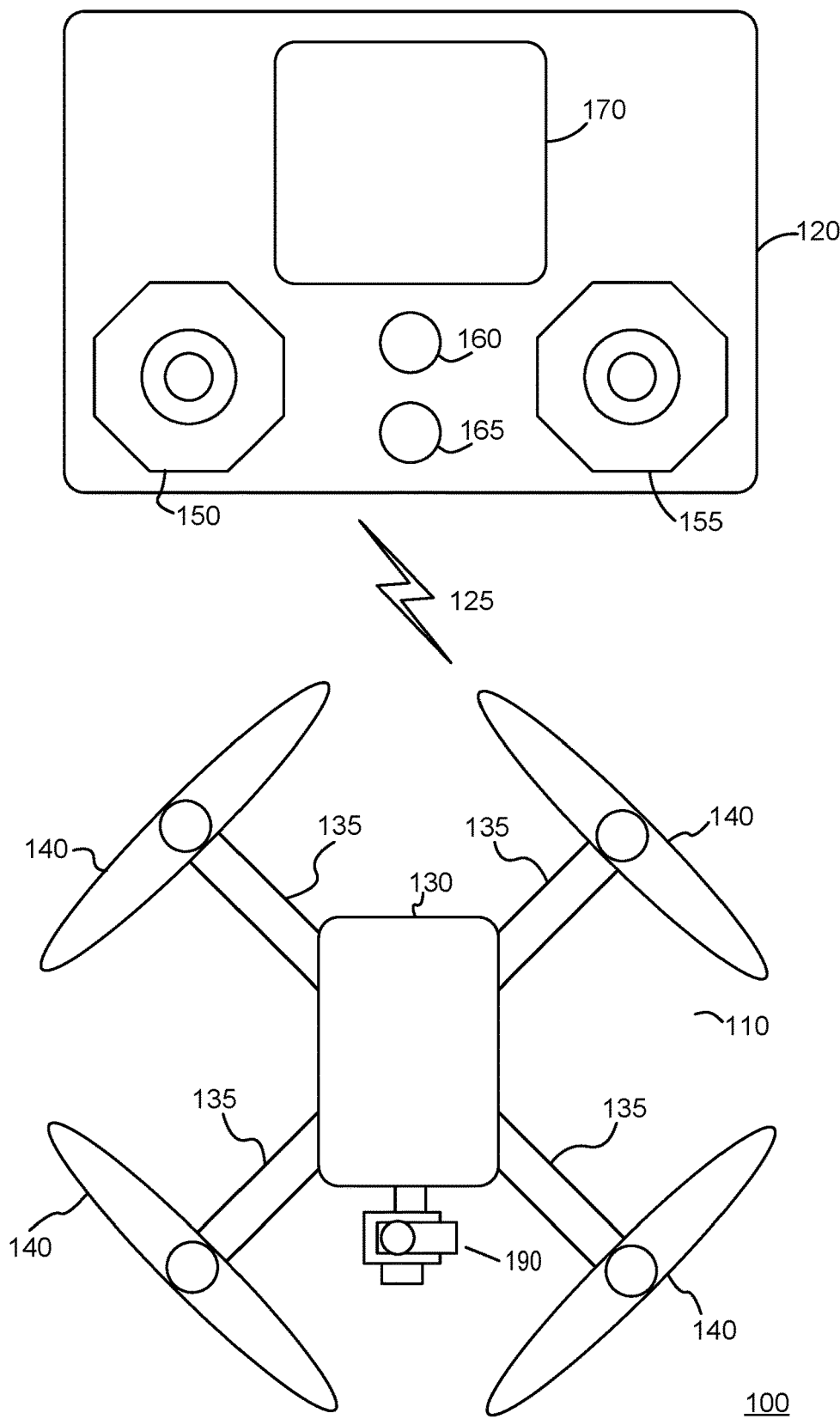
FIG. 1 illustrates an example configuration of a remote controlled aerial vehicle in communication with a remote controller, according to one example embodiment.

The Figures (FIGS.) and the following description relate to preferred embodiments by way of illustration only. It should be noted that from the following discussion, alternative embodiments of the structure and methods disclosed herein will be readily recognized as viable alternatives that may be employed without departing from the principles of what is claimed.

Reference will now be made in detail to several embodiments, examples of which are illustrated in the accompanying figures. It is noted that whenever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A controller system, such as a flight controller, may interface with one or more sensors and one or more actuators. The controller system may include one or more modules which may be organized into a pipeline. Modules of the same type may execute in parallel while modules of different types may execute in sequence. Each module of the controller system may take input synchronously from a preceding module and output one or more signals to a following module. An execution time of each module may be constant.

The pipeline may include one or more drivers, one or more filters, a combine, one or more estimators, one or more controllers, a mixer, and one or more actuator controllers. The drivers may be configured to receive sensor data and to pre-process the received sensor data. The filters may be configured to filter the pre-processed sensor data to generate filtered sensor data. The combine may be configured to package the filtered sensor data to generate packaged sensor data. The estimators may be configured to determine estimates of a position of a vehicle based on the packaged sensor data. The controllers may be configured to generate control signals based on the determined estimates. The mixer may be configured to modify the generated control signals based on limitations of the vehicle. The actuator controllers may be configured to generate actuator control signals based on the modified control signals.

A scheduler may schedule an execution time for each module in the pipeline such that low priority tasks/modules may execute without adversely affecting an execution time of high priority tasks/modules. The scheduler may have preemption and priority based scheduling. For example, high priority tasks may have a short execution time and may run frequently whereas low priority tasks may have a longer execution time and may run less frequently. By way of another example, if execution time may be fixed or bounded, the system may be configured to accommodate both ranges of tasks. In this example, high priority tasks may have a very short execution time and need to run very frequently while other lower priority tasks may take longer to run but run less frequently. If the times are fixed or bounded and the scheduler has preemption and priority, then both may be scheduled to execute properly. For instance, a driver that runs every 1 millisecond (ms) for 3 microseconds can interrupt an algorithm that takes 8 ms to run but only needs to run every 20 ms. There can be sufficient time for both to run; however, the driver must interrupt the algorithm several times during its execution. Both may have some hard real-time deadline but that may be accommodated if execution times may be fixed or bounded.

Example System Configuration

The descriptions herein are in the context of a remote controlled aerial vehicle (or drone), for example, a rotary wing (or rotary blade), such as a quadcopter, or fixed wing aircraft. However, disclosed configurations may apply to other remote controlled vehicles such as boats and cars. In addition, the remote controlled vehicles may have hobby sized form factors. Remote control aerial vehicles may sometimes be referred to as unmanned aerial vehicles (UAVs) or drones and in this context may include camera units/hardware for capturing images and/or videos.

Turning now to FIG. 1, it illustrates an example aerial capture platform (or system) 100. The aerial capture platform 100 may include a remote controlled aerial vehicle 110 in communication with a remote controller 120. The aerial vehicle 110 and the remote controller 120 may be communicatively coupled through a wireless link 125. The wireless link 125 may be a Wi-Fi link, cellular (e.g., long term evolution (LTE), 3G, 4G, 5G) or other wireless communication link. In this example, the aerial vehicle 110 is illustrated as multi-rotary blade aerial vehicle. Here, the multi-rotary blade aerial vehicle is illustrated with four rotary blades, and thus, also may be referenced as a quadcopter. Also, in this example, the remote controller 120 is illustrated as a dedicated remote controller, but the principles described herein may apply to other devices that may operate as a remote controller, for example, a smartphone, tablet, and/or a laptop.

The aerial vehicle 110 in this example includes a housing (or body) 130, a gimbal 190, two or more arms 135, and two or more propellers 140. The housing 130 may have one or more cavities for a payload. The payload may include, for example, electronic circuitry (e.g., controls and processing components), batteries and/or sensors. The payload may include mechanisms such as a parachute. The parachute may be in a portion of the housing 130 that may open so that the parachute may deploy in certain pre-determined situations. The parachute and/or corresponding portion of the housing 130 may couple with electronics that may provide the logic for deployment of the parachute. The housing 130 may include a communication subsystem (which may include corresponding electronics and/or firmware) and a control subsystem (which may include corresponding electronics and/or firmware). The communication subsystem may be used to wirelessly communicate with a remote controller (e.g., the remote controller 120) or other interfaces on the aerial vehicle 110. The control subsystem may be used/configured to control operations of various systems on the aerial vehicle 110, for example, a power system, a flight operation system and other such systems. The communication subsystem and the control subsystem are described further in detail with respect to FIG. 2.

The gimbal 190 may be a removable structure. For example, the gimbal 190 may removably (or releasably) mount within an opening on the housing 130 of the aerial vehicle 110. Further by example, when removed from the aerial vehicle 110, the gimbal 190 may be mounted on another structure, for example, a pole mount. The gimbal 190 may couple with a removable camera frame. Alternately, the gimbal 190 may be integrated with the housing 130. The gimbal 190 also may include a camera secured directly with it or through the camera frame. The camera frame may be removed and fitted for the particular camera that couples with it. Alternately, the camera frame may be integrated with the gimbal.

Each arm 135 of the aerial vehicle 110 may removably couple with the housing 130. In addition, each arm 135 is movable and may fold toward the housing 130 when the aerial vehicle 110 is not operational for flight and may fold back away from the housing 130 when the aerial vehicle 110 is operational for flight. In addition, each arm 135 includes a thrust motor (which may include a rotor) that may mechanically, and removably, couple with a propeller 140 to create a rotary assembly. The thrust motor spins the propeller 140 in an appropriate direction to allow the aerial vehicle 110 to move based a command that is executed. For example, when the rotary assembly is operational, all the propellers 140 spin in appropriate directions and/or at speeds to allow the aerial vehicle 110 to lift (take off), tilt, turn, land, hover, and/or otherwise move (up, down, forward, reverse (or backward), etc.) in flight. In addition, the aerial vehicle 110 may include landing gear (not shown) on an underside of the housing 130. The landing gear may be configured to fold toward the housing 110 when the aerial vehicle 110 is in flight. The landing gear may extend outward away from the housing 110 when the aerial vehicle 110 is at rest on a surface.

The remote controller 120 may include a first control panel 150 and a second control panel 155 (collectively referred to as "control panels 150, 155"), an ignition button 160, a return button 165 and a display 170. It is noted that more or less control features and buttons may be included. The remote controller 120 may be used to control operation of the aerial vehicle 110. This operation may include pitch, roll, and yaw control for the aerial vehicle 110 in addition to other functions.

The control panels 150, 155 may be used by a user to initiate control operations. The control panels 150, 155 may be mechanical (e.g., joystick, roller ball, etc.) or solid state (e.g., touch pad). For example, the first control panel 150 may be used to control "up-down" direction (e.g. lift and landing) of the aerial vehicle 110. The second control panel 155 may be used to control "forward-reverse" (e.g., thrust/drag) direction of the aerial vehicle 110. In addition, a combination of the control panels 150, 155 with another controller mechanism (e.g., a wheel), may be used for "left-right" and/or hover movement. It is noted that these are just examples and that the control panels 150, 155 may be assigned other or different functions.

The ignition button 160 may be used to remotely turn on and/or start (as well as turn off and/or pause operation of) the aerial vehicle 110 components. For example, a single press of the ignition button 160 may start operation of a first set of components (e.g., sensors and lighting) on the aerial vehicle 110 and a second press may start operation of a second set of components (e.g., the rotary assembly (e.g., start the propellers 140)), on the aerial vehicle 110. The return button 165 (or the return to home (RTH) or come home button) may be used to override the controls of the remote controller 120 and transmit instructions to the aerial vehicle 110 to return to a predefined location.

The ignition button 160 and the return button 165 may be mechanical and/or solid state press sensitive buttons. In addition, each button 160, 165 may be illuminated with one or more light emitting diodes (LED) to provide additional details. For example, the LED may switch from one visual state to another to indicate with respect to the ignition button 160 whether the aerial vehicle 110 is ready to fly (e.g., lit green) or not (e.g., lit red). The LED also may provide visual indicators corresponding to aerial vehicle 110 operation in flight, for example, if it is in an override mode on return path (e.g., lit yellow) or has a battery power level below a predefined threshold (e.g., lit green when above a first threshold, lit yellow when just below that threshold, and lit red below a lower threshold). It also is noted that the remote controller 120 may include other dedicated hardware buttons and/or switches and those buttons and switches may be mechanical and/or solid state buttons and switches. For example, another button may be added to transmit signals/instructions to the aerial vehicle 110 to deploy the parachute.

The remote controller 120 may include dedicated buttons corresponding to functions on the remote controlled aerial vehicle 110, for example, a camera shutter button for signaling (or triggering) taking still or video images, changing image capture resolution, changing frame rate, etc. Other buttons can be used for functions such as camera controls, including control settings, for example, tagging images, transmitting (or sharing) captured images, etc.

The remote controller 120 may include a screen (or display) 170. The screen 170 provides for visual display. The screen 170 may be a touch sensitive screen. The screen 170 may be, for example, a liquid crystal display (LCD), an LED display, an organic LED (OLED) display, or a plasma screen, etc. The screen 170 may allow for display of information related to the remote controller 120, for example, menus for configuring the remote controller 120 and/or remotely configuring the aerial vehicle 110, and/or controlling a camera and/or gimbal 190 coupled with the aerial vehicle 110. The screen 170 can display images captured from a camera coupled with the aerial vehicle 110.

Example Electronics and Control System for Aerial Vehicle

Figure 2:
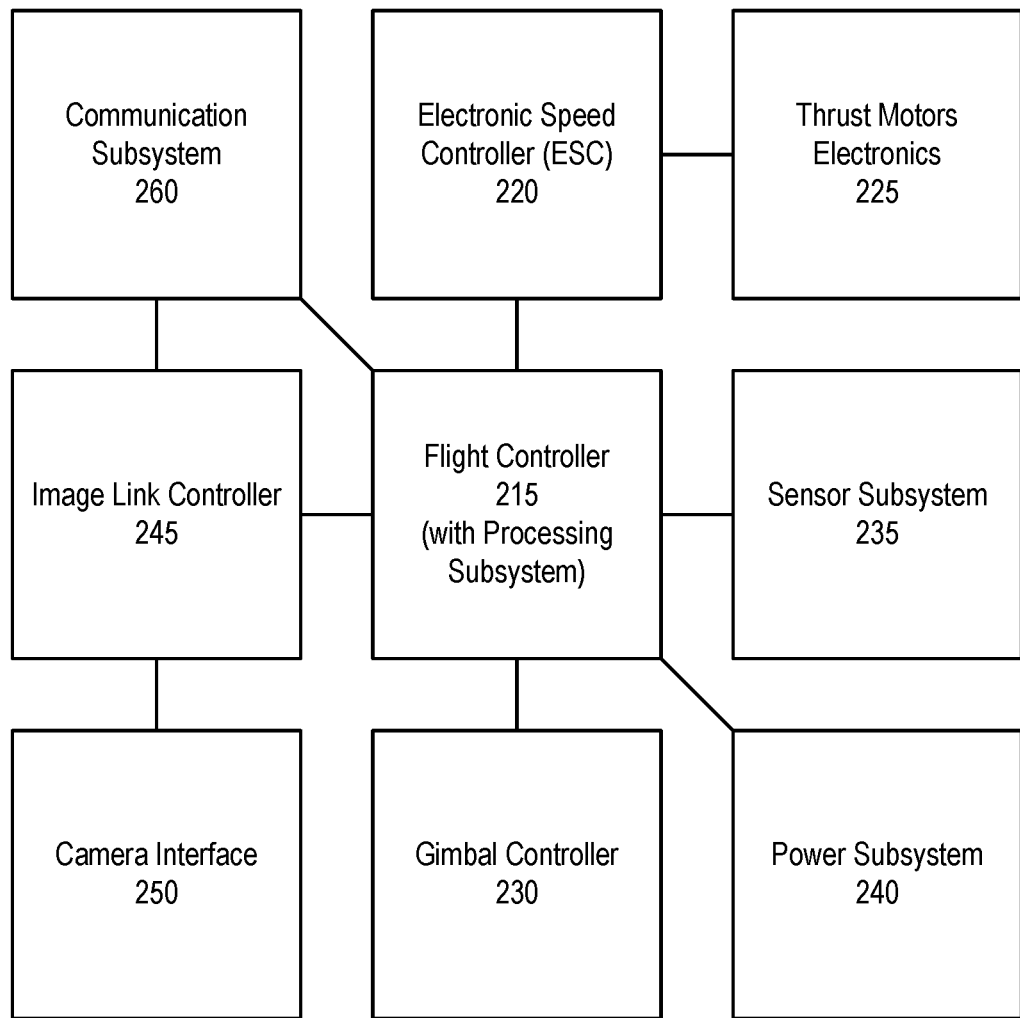
FIG. 2 illustrates an example of aerial vehicle electronics and control systems, according to one example embodiment.

FIG. 2 illustrates an example embodiment of an electronics and control (EC) system 210 of the aerial vehicle 110, according to one example embodiment. The example EC system 210 may include a flight controller 215, an electronic speed controller (ESC) 220, one or more thrust motors electronics 225, a gimbal controller 230, a sensor subsystem (which may include telemetric subsystems) 235, a power subsystem 240, an image link controller 245, a camera interface 250, and a long range communication subsystem 260. The components may communicate directly or indirectly with each other through a data bus within the aerial vehicle 110.

Figure 7:
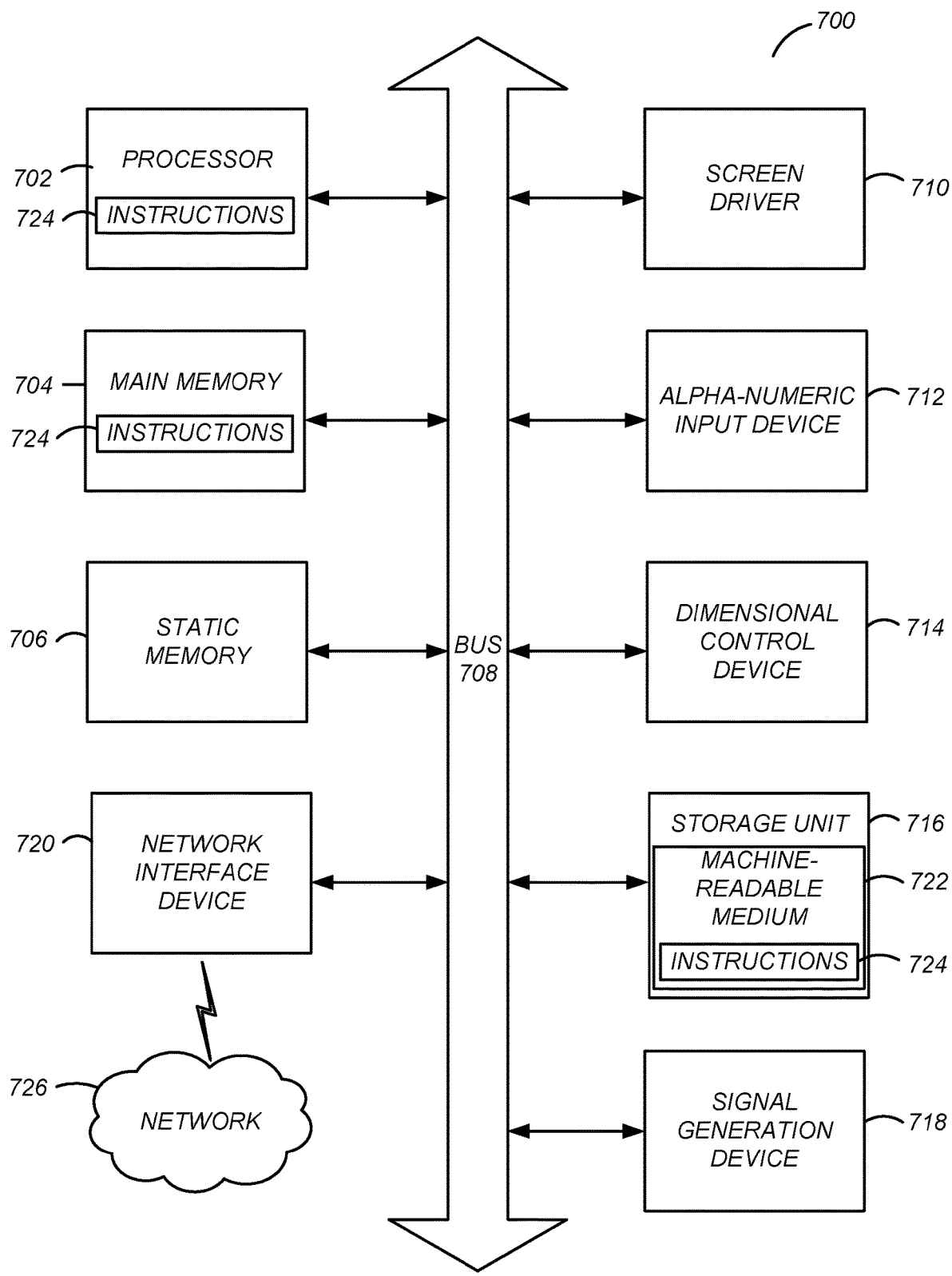
FIG. 7 illustrates an example machine for use with a system of an aerial vehicle, according to one example embodiment.

The aerial vehicle 110 components may be embodied in hardware, software, or a combination thereof. The software, which may include firmware, may be referenced as program code, computer program product, or program instructions, and may be comprised of one or more instructions. Software may include an operating system, which provides an interface to a processor, and on which software applications run (or execute). Software may be executed by one or more processors within the aerial vehicle 110. A processor also may include, for example, controllers, application specific integrated circuits (ASICs) and/or field programmable gate arrays (FPGAs). The processor may be configured to execute the software in a specific manner. FIG. 7 provides an example machine architecture with a processor that may be configured to execute software. It is noted that not all the components of FIG. 7 may be included in the aerial vehicle 110. FIG. 7 is intended to be illustrative in describing an architecture of a computing system, of which all or parts may operate within the aerial vehicle 110 and the EC system 210.

In this example, the aerial vehicle 110 may be configured to include an aerial vehicle operating system (AVOS). By way of example, the AVOS may be built on an operating system kernel, for example, LINUX, and/or may be based on an operating system such as ANDROID OS. The software components of aerial vehicle described in the disclosure may operate with the AVOS.

Turning now to the example components of the EC system 210, a further description of each component is provided. In one example embodiment, the flight controller 215 of the EC system 210 may coordinate and process software for the aerial vehicle 110. The flight controller 215 may integrate the AVOS. Examples of processing directed by the flight controller 215 include coordinating communication with the remote controller 120 through the communication subsystem 260 and processing commands to and from the remote controller 120. The flight controller 215 may also control flight related operations of the aerial vehicle 110 by control over the other components such as the ESC 220 and the sensor subsystem 235. The flight controller 215 may also interface with the gimbal controller 230 to assist with controlling the motors of the gimbal 190. In addition, the flight controller 215 may be used to assist with the image link 245 for camera control operations. The flight controller 215 may also interface with the power subsystem 240 to manage and supply power to the components of the EC system 210.

Referring now to the ESC 220, it may be configured to interface with the thrust motors electronics 225. The ESC 220 may be configured to control, via the thrust motors electronics 225, the speed applied by thrust motors in the arms 135 to the propellers 140. The ESC 220 may control each thrust motor through the thrust motors electronics 225 individually or in groups or subgroups. It is noted that the thrust motors electronics 225 may be integrated with the thrust motors.

Next, the gimbal controller 230 may include control electronics (and may include firmware) that may be configured to control operation of the motors for each axis of the gimbal 190. The gimbal controller 230 may receive commands via the flight controller 215. The commands may originate from the remote controller 120, which may pass them to the flight controller 215 via the communication subsystem 260.

Turning next to the image link controller 245, it may be configured to communicate with the camera interface 250 to transmit commands that may include capture of images from a camera for transmission to the remote controller 120 (and/or other devices with a screen, such as a smart phone or tablet), for example, via the communication subsystem 260. The images may be overlaid and/or augmented with other data from the aerial vehicle 110 such as, for example, sensor data from the sensor subsystem 235. When images are sent to both the remote controller 120 and another device, the overlaid information may be the same on each device or distinct on each device. It is noted that the image link controller 245 may have a processing configuration that allows commands to be directly transmitted between the communication subsystem 260 and the camera interface 250. Alternately, or additionally, the image link controller 245 may communicate with the flight controller 215 for processing resources and application of software configurations.

The camera interface 250 may be configured to receive camera control commands from the image link controller 245. The camera control commands may include commands to set up camera operations, (e.g., frame capture rate, still or video images, and the like). The camera control commands may originate from the remote controller 120 and may be received via the communication subsystem 260 and image link controller 245 of the EC system 210.

Turning next to the sensor subsystem 235, it may include one or more sensors. One or more sensors may be further grouped as sensor modules to gather particular types of data. For example, one sensor module may be for positional sensors and another sensor module may be for environmental sensors. Positional sensors may provide location and/or relative location in space and orientation information of the aerial vehicle 110. Positional sensors may assist with navigation and location related operations of the aerial vehicle 110. Positional sensors may include, for example, gyroscopes, accelerometers, compasses, global positioning system (GPS) sensors, motion sensors, and/or altimeters. Environmental sensors may provide information of a particular environment. For example, environmental sensors may provide information on environmental conditions external to the housing 130 of the aerial vehicle 110. Further by example, environmental sensors may provide information on conditions within the housing 130 of the aerial vehicle 110. Environmental sensors may include, for example, temperature sensors, photodetectors, heat sensors, moisture sensors, and/or barometric sensors. It is noted that in some example instances, an environmental sensor may also operate as a positional sensor for purposes of how the data may be used and vice versa. For example, a photodetector may be used to determine time of day for a flight, but also may be used to detect shadows for avoidance detection during flight of the aerial vehicle 110. Similarly by way of example, a barometric sensor may be used to determine atmospheric pressure and aerial vehicle 110 altitude. Note that other sensor configurations also may be included in addition to the examples given.

The sensor data from the sensor subsystem 235 may include sensor metadata and may be integrated with images and/or metadata from a camera. The images from the camera, which may also include additional metadata, may be transmitted wirelessly to other devices and/or stored for later playback. When the images are displayed (e.g., played in real-time or from storage), the sensor data may be extracted from it and provided for display on a screen, for example, the screen 170 of the remote controller 120 or a screen of a computing device (e.g., laptop, smartphone, tablet, and/or desktop computer). The camera interface 250 may interface with a camera or may include an integrated camera.

The power subsystem 240 may be configured to manage and supply power to the components of the EC system 210. The power subsystem 240 may include a battery pack and a protection circuit module as well as a power control/battery management system. The battery may be replaceable and/or rechargeable. The battery of the power subsystem 240 may be configured to charge the camera in flight as needed or pre-flight. Other devices also may be charged using the energy capacity of the battery of the power subsystem 240, for example, the remote controller 120, a powered handheld grip, or a mobile phone. The battery may also be used to charge the camera, or other devices, post-flight, depending on energy remaining in the battery. Further, the power subsystem 240 may be configured to include a dual power path. A first path allows for a first power level (e.g., low current) to be used to power up the aerial vehicle 110 and its onboard components. Once components are powered, the aerial vehicle 110 may transition to a second power level (e.g., high current) which is sufficient to consistently drive the thrust motors and onboard components during flight. In addition, a regenerative charging configuration may be integrated into the power subsystem 240. For example, the power subsystem 240 may include a recharge circuit electrically coupled with the thrust motors so that when the thrust motors are decelerating, current is pushed back through the recharge circuit to charge the battery of the power subsystem 240.

The communication subsystem 260 may include communication electronics (and may include corresponding firmware) for the aerial vehicle 110. For example, the communication subsystem 260 may include a long range WiFi system. It may further include additional wireless communication components. For example, it may include another WiFi system, which may allow for one WiFi system to be dedicated to direct control communications with the remote controller 120 and the other WiFi system may be used for other communications, such as image transmissions. It may include a communication system such as one based on long term evolution (LTE), 3G, 4G, 5G or other mobile communication standard. The communication subsystem 260 may be configured with a unidirectional remote control channel for communication of controls from the remote controller 120 to the aerial vehicle 110 and a separate unidirectional channel for an image downlink from the aerial vehicle 110 to the remote controller 120 (or to a video receiver where direct image connection may be desired). The communication subsystem 260 may be used to allow for other services, for example, to provide over the air or hardwire link updates, such as firmware updates to the aerial vehicle 110. Some third-party services may be provided access to the communication subsystem 260 or components within via application programming interfaces (API).

Example Controller Architecture

Figure 3:
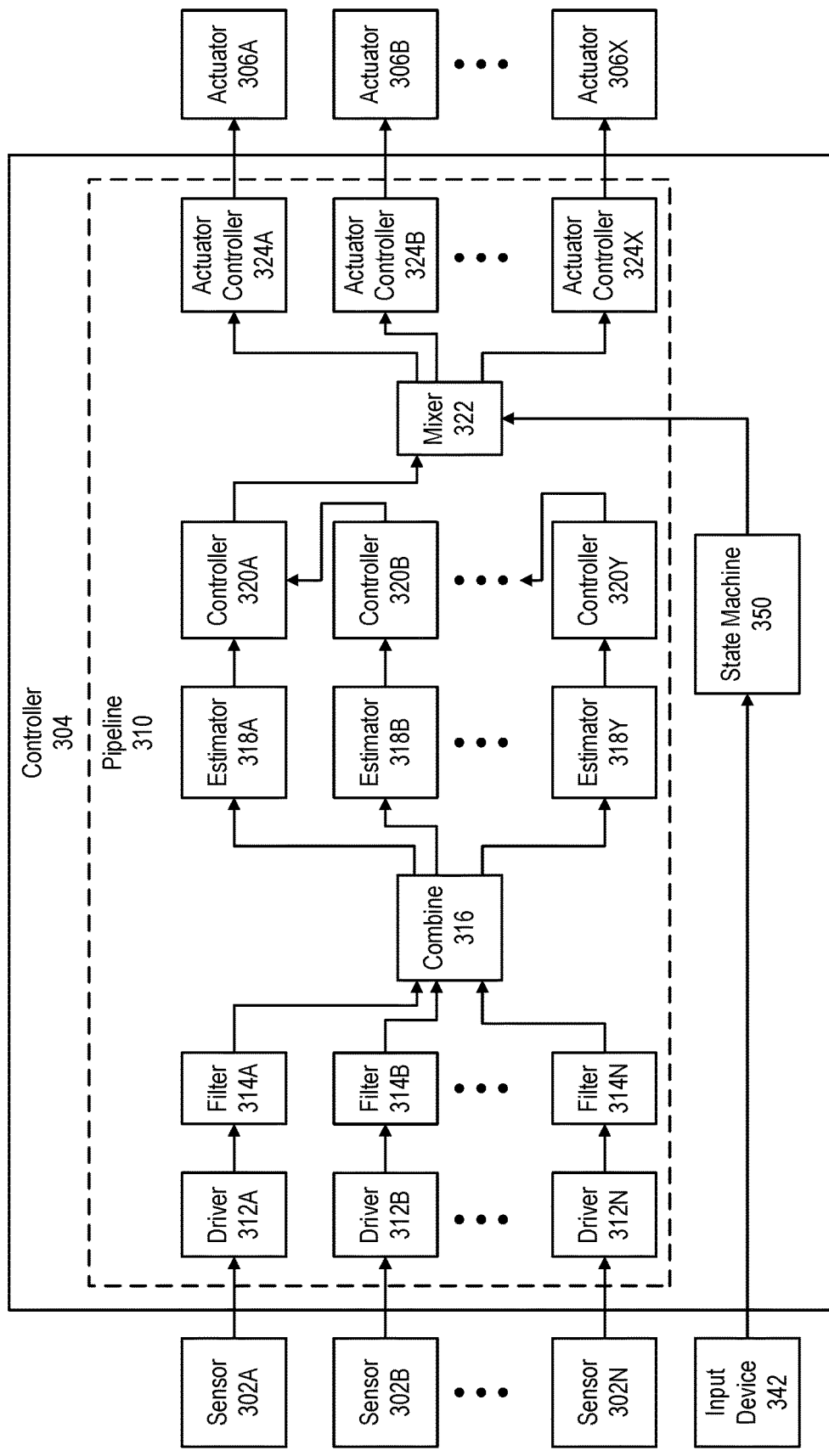
FIG. 3 illustrates an example pipeline flight processing environment including sensors, a controller, and actuators, according to one example embodiment.

FIG. 3 illustrates pipeline flight processing environment 300 (hereinafter referred to as "processing environment 300"), according to one example embodiment. The processing environment 300 may include sensors 302A through 302N (hereinafter collectively referred to as "sensors 302"), a controller 304, and actuators 306A through 306X (hereinafter collectively referred to as "actuators 306"). For example, the sensors 302 may be a part of the sensor subsystem 235, and the controller 304 may be a part of the flight controller 215, and the actuators 306 may correspond with powered components (e.g., thrust motors in the arms 135 coupled to the propellers 140) and may be a part of the thrust motors electronics 225.

The sensors 302 may provide sensor data including location information, orientation information, and/or environmental information. The sensors 302 may include, for example, gyroscopes, accelerometers, compasses, global positioning system (GPS) sensors, motion sensors, altimeters, temperature sensors, photodetectors, heat sensors, moisture sensors, and/or barometric sensors.

In some configurations, the sensors 302 may receive a request from the controller 304 for new sensor data. For example, the sensors 302 may receive a request from the controller 304 periodically (e.g., once every microsecond). The sensors 302 may transmit new sensor data to the controller 304 in response to the request. In other configurations, the sensors 302 may interrupt the controller 304 and transmit new sensor data. For example, the sensors 302 may interrupt the controller 304 periodically (e.g., once every microsecond). The sensors 302 interrupting the controller 304 with new sensor data may reduce latency than compared to the sensors 302 transmitting the new sensor data in response to a request from the controller 304.

Figure 4:
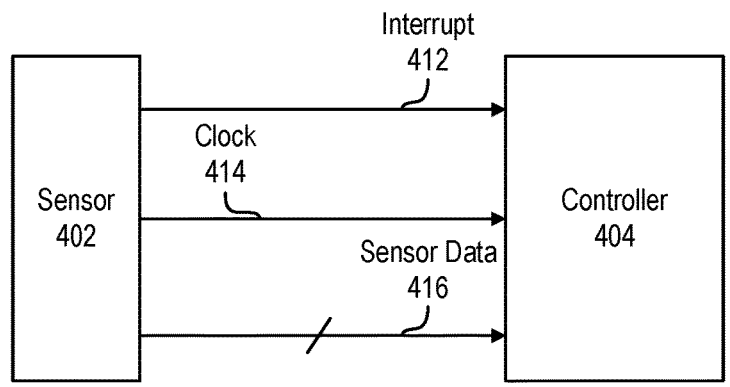
FIG. 4 illustrates an example interaction between a sensor and a controller, according to one example embodiment.

Turning briefly to FIG. 4, it illustrates an interaction between a sensor 402 (e.g., a sensor from the sensors 302) and a controller 404 (e.g., the controller 304), according to one example embodiment. The sensor 402 may transmit an interrupt signal 412, a clock signal 414, and sensor data 416 to the controller 404. The interrupt signal 412 may indicate an event at the sensor 402 needs immediate attention by the controller 404 (e.g., that the sensor 404 has new sensor data available). The event at the sensor 402 may be of varying priority, for example, low priority, medium priority, high priority, and/or urgent priority. The clock signal 414 may be used to synchronize the operation of the sensor 402 and the controller 404. The sensor data 416 may include location information, orientation information, and/or environmental information.

Returning to FIG. 3, the controller 304 may include a pipeline 310 and a state machine 350. The pipeline 310 may reduce latency and jitter from the controller 304 inputs (e.g., sensors 302) to the controller 304 outputs (e.g., actuators 306). Latency may be, for example, a total processing time from each input to each output and jitter may be, for example, a variation in the total processing time from each input to each output. The pipeline 310 allows for parallel computing in the controller 304. For example, while pipeline 310 is waiting for input (e.g., new sensor data from the sensors 302), the controller 304 may execute other tasks. The pipeline 310 may start based on input from the sensors 302. For example, the pipeline 310 may start based on an interrupt signal from an inertial magnetic unit (IMU) sensor.

The pipeline 310 may include a set of data processing elements (e.g., hardware and/or software modules) connected in series, where an output of one element is coupled to an input of a next element. As illustrated in FIG. 1, the pipeline 310 may include drivers 312A through 312N (hereinafter collectively referred to as "drivers 312"), filters 314A through 314N (hereinafter collectively referred to as "filters 314"), a combine 316, estimators 318A through 318Y (hereinafter collectively referred to as "estimators 318"), controllers 320A through 320Y (hereinafter collectively referred to as "controllers 320"), a mixer 322, actuator controllers 324A through 324X (hereinafter collectively referred to as "actuator controllers 324"). As illustrated, there may be "N" sensors 302, drivers 312, and filters 314, "Y" estimators 318 and controllers 320, and "X" actuator controllers 324. "N" may be greater than "Y" which may be greater than "X."

A scheduler (not shown) may schedule an execution time for each module in the pipeline 310 such that low priority tasks/modules may execute without adversely affecting an execution time of high priority tasks/module. The scheduler may have preemption and priority based scheduling. For example, high priority tasks may have a short execution time and may run frequently whereas low priority tasks may have a longer execution time and may run less frequently. By way of another example, if execution time may be fixed or bounded, the system may be configured to accommodate both ranges of tasks. In this example, high priority tasks may have a very short execution time and need to run very frequently while other lower priority tasks may take longer to run but run less frequently. If the times are fixed or bounded and the scheduler has preemption and priority, then both may be scheduled to execute properly. For instance, a driver that runs every 1 millisecond (ms) for 3 microseconds can interrupt an algorithm that takes 8 ms to run but only needs to run every 20 ms. There can be sufficient time for both to run; however, the driver must interrupt the algorithm several times during its execution. Both may have some hard real-time deadline but that may be accommodated if execution times may be fixed or bounded. By way of yet another example, some tasks may be timed such that the tasks run each time the controller 304 receives new sensor data from the sensors 302.

The scheduler may use a real-time clock to schedule tasks that have different cadence. Resource patterns such as semaphore and mutex may be used to signal to the scheduler that there are pending tasks/actions. The data processing elements of the pipeline 310 (e.g., the drivers 312, the filters 314, the combine 316, the estimators 318, the controllers, 320, the mixer 322, and the actuator controllers 324) may execute at a constant time. An execution time of each of the data processing elements may be less than the execution time of the pipeline 310. In some configurations, the minimum, maximum, and average execution time of each of the data processing elements may be equivalent. In other configurations, the execution time of each of the data processing elements may be bounded. In other words, the maximum execution time may have an upper threshold. Executing the data processing elements at a constant time may be advantageous as it may reduce latency and jitter, and may increase the operating frequency and efficiency of the pipeline 310 and/or controller 304.

The drivers 312 may request/receive the new sensor data from the sensors 302. In some configurations, the drivers 312 may request for the new sensor data from the sensors 302 and in response may receive the new sensor data from the sensors 302. For example, the drivers 312 may request for the new sensor data periodically. In other configurations, the drivers 312 may be interrupted by the sensors 302 with the new sensor data. For example, the drivers 312 may be interrupted periodically. The drivers 312 may pre-process the new sensor data. Pre-processing the new sensor data may include correcting for sensor translation and rotation relative a center of mass of the aerial vehicle 110, correcting for bias, scaling, applying calibration data, and the like. The drivers 312 may output the pre-processed sensor data.

The filters 314 may filter the pre-processed sensor data received from the drivers 312. Filtering the sensor data may include reducing the sampling rate of (e.g., downsampling) the sensor data. For example, the filters 314 may keep every fourth data of the sensor data and thereby may reduce the sampling rate of the sensor data. Filtering may include decimating, low-pass filtering, high-pass filtering, band-pass filtering and/or other filtering techniques may be used. The filters 314 may filter the sensor data differently on a per-sensor basis based on the sensor 302 that the sensor data originated from. The filters 314 may output the filtered sensor data.

The combine 316 may package the filtered sensor data received from the filters 314 into packaged sensor data. Packaging the filtered sensor data may include combining the filtered sensor data for a period of time. The period of time may be a time corresponding to a cycle of the pipeline 310. The combine 316 may output the packaged sensor data.

The estimators 318 may determine estimates regarding a position of a vehicle (e.g., the aerial vehicle 110) including the sensors 302 based on the packaged sensor data received from the combine 316. Determining the estimate may include determining attitude information, altitude information, heading information, and/or an absolute position relative to the earth. In some configurations, the estimators 318 may determine whether the packaged sensor data includes errors or is otherwise corrupted. If the estimators 318 determine the packaged sensor data does not include errors, the estimators 318 may determine the estimate; otherwise, the estimators 318 may suspend further determinations until new packaged sensor data is received. The estimators 318 may output the estimate regarding the position of the vehicle.

The controllers 320 may generate control signals based on the estimates received from the estimators 318. Further, a higher order controller may generate its control signals further based on control signals of a lower order controller. For example, a first estimator (e.g., estimator 318B) may determine a first estimate and a second estimator (e.g., estimator 318A) may determine a second estimate. The lower order controller (e.g., controller 320B) may generate first control signals based on the first estimate from the first estimator, and the higher order controller (e.g., controller 320A) may generate second control signals based on the second estimate from the second estimator and the first control signals from the lower order controller. Each controller (e.g., controller 320A, 320B, . . . , 320N) may generate different control signals. For example, a position controller may generate control signals for velocity, a velocity controller may generate control signals for an angle, an angle controller may generate control signals for a rate, a rate controller may generate control signals for thrust and may include a thrust vector. The highest order controller (e.g., controller 320A) may transmit its control signals to the mixer 322. The controller 320A may be, for example, a rate controller and may transmit a thrust vector to the mixer 322.

The state machine 350 may inform the mixer 322 of the data processing elements currently executing. As illustrated in FIG. 3, the state machine 350 may not be a part of the pipeline 310 and may have no effect on the data processing elements of the pipeline 310. Furthermore, the state machine 350 may not be time dependent. The state machine 350 may maintain a state of the pipeline 310 and may move the pipeline 310 through various operational states, such as, for example, initialization, ready for take-off, take-off, flight, sensor error, ready for landing, landing, landed, and the like.

The state machine 350 may receive input from an input device 342. The input device 342 may be, for example, the aerial vehicle 110 and/or the remote controller 120. In some configurations, the input device 342 may be one or more of the sensors 302 and may transmit sensor data such as, for example, IMU sensor data, global positioning system (GPS) sensor data, and the like. In other configurations, the input device 342 may be one or more modules of the pipeline 310 (e.g., the drivers 312, the filters 314, the combine 316, the estimators 318, and/or the controller 320). In these configurations, the state machine 350 may make assumptions that tasks may run for fixed times periodically at a rate the drivers 312 receive new sensor data from the sensors 302. If tasks do not run or if tasks do not complete in a fixed or bounded time, the state machine 350 may flag an error. The state machine 350 may further move the pipeline 310 into a specific operational state (e.g., an error state). For example, an estimator of the estimators 318 may run for 100 microseconds (μs) every 4 milliseconds (ms) when gyroscope data from a gyroscope sensor of the sensors 302 is expected. Responsive to the state machine 350 detecting that in 8 ms the estimator has not run or that the estimator has run for greater than 100 μs in any 4 ms window, the state machine may flag an error. The guarantee of real-time systems (e.g., the pipeline flight processing environment 300) may be based on both proper operation and design calculations and assumptions that must remain true during operation. For example, if the state machine 350 makes an assumption that a task will complete in 100 μs but 0.001% of the time it the task completes in 103 μs, then the execution may be fine but there may not be a guarantee that the task would operate as expected. The controller 304 may be designed for a 10% margin on all assumptions.

The state machine 350 may receive input from the input device 342 and may transmit one or more signals (i.e., "signal") to one or more modules of the pipeline 310 connected to the output of the state machine 350. In one example, the state machine 350 may transmit a signal to "arm" the module of the pipeline 310 connected to the output of the state machine 350. The state machine 350 may further transmit one or more signals to the aerial vehicle 110 and/or the remote controller 120 to turn on light emitting diodes (LEDs) to indicate the pipeline 310 is "armed." The state machine 350 may transmit one or more signals to the actuator controllers 324 to rotate or spin the actuators 306 and may allow the remote controller 120 to alter outputs of the actuator controllers 324 to achieve controlled flight. As illustrated in FIG. 3, the state machine 350 may transmit a signal to the mixer 322 to arm the mixer 322. In another example, the state machine 350 may change a state, may transmit a signal to one or more of the drivers 312 to change an operating mode (e.g., from a first operating mode to a second operating mode), and may transmit a signal to one or more of the controllers 320 to change to a specific operating mode. The state machine 350 may provide non-time related information to the mixer 322. For example, the state machine 350 may identify a current hardware configuration and, responsive to the identification, may transmit the one or more signals to the mixer 322. For example, when the aerial vehicle 110 and/or the remote controller 120 are/is turned on (e.g., booted up), the state machine 350 may receive an input signal from the input device 342, and may transmit one or more signals to the mixer 322 to modify commands for driving the actuators 306 to an initial position (e.g., take-off position). In some configurations, the state machine 350 may track a maximum execution time and an actual execution time of each of the data processing elements, and may transmit an error signal when the actual execution time exceeds the maximum execution time.

In some configurations, the modules of the pipeline 310 (e.g., the drivers 312, the filters 314, the combine 316, the estimators 318, the controllers 320, the mixer 322, and the actuator controllers 324) may determine what to do based on a published state of the state machine 350. In one example, the controllers 320 may generate control signals based on a start point of the state machine 350. In another example, the actuator controllers 324 may generate actuator control signals based on whether the state of the state machine 350 permits doing so and a set point input to the actuator controllers 324.

The mixer 322 modifies the control signals based on physical limitations of the actuators 306 and/or the vehicle including the actuators 306. The mixer 322 may synchronously trigger each of the actuator controllers 324. The mixer 322 may output the modified control signals during each cycle of the pipeline 310. In some configurations, the mixer 322 may output the modified control signals as soon as the control signals are modified.

The actuator controllers 324 may generate actuator control signals based on the modified control signals. The actuator controllers 324 may be, for example, motor controller drivers for various motors. Each of the actuator controllers 324 may output an actuator control signal during each cycle of the pipeline 310 at a same instance in time. In some configurations, each actuator control signal may be, for example, a three-phase sinusoidal pulse width modulation (PWM) signal for driving a current of an actuator (e.g., one of the actuators 306). In other configurations, each actuator control signal may be, for example, a trapezoidal PWM signal for driving a voltage of an actuator (e.g., one of the actuators 306).

The actuators 306 may be components responsible for moving or controlling the aerial vehicle 110.

Figure 5:
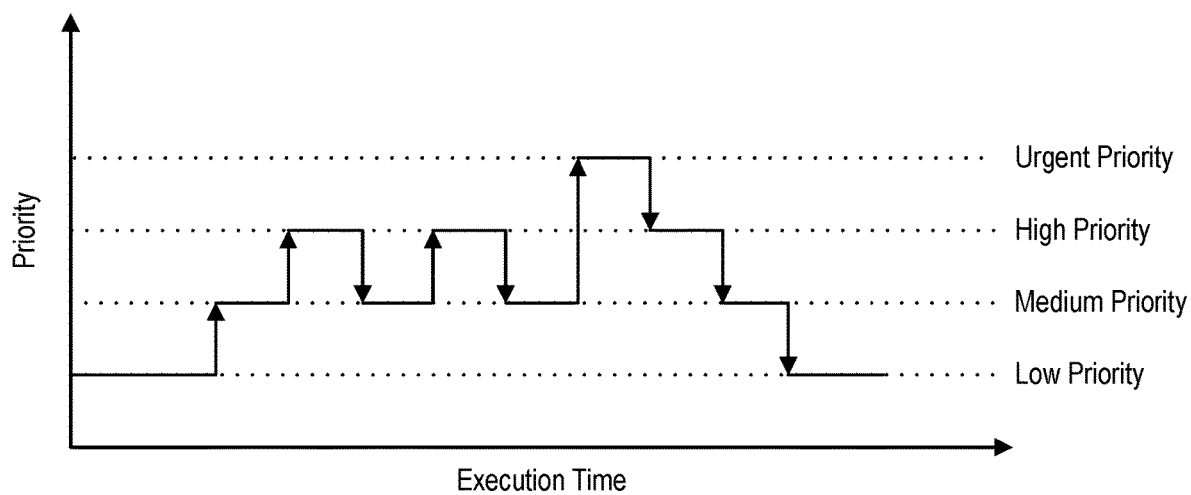
FIG. 5 illustrates priorities of tasks as a function of execution time, according to one example embodiment.

FIG. 5 illustrates priority as a function of time, according to one example embodiment. Constant time (or minimally bounded time) may make real-time systems (e.g., the pipeline 310 and/or the controller 304) deterministic. The modules of the pipeline 310 (e.g., the drivers 312, the filters 314, the combine 316, the estimators 318, the controllers 320, the mixer 322, and the actuator controllers 324) may incur delay and thus may have real-time dependency. Each execution of modules of the pipeline 310 may have a priority associated with it. For example, the associated priority may be low, medium, high, and/or urgent. Each upward arrow is a preemption. The execution time may be constant or bounded. Examples of low priority tasks may include logging, user interface, and/or low priority communications. Examples of urgent priority tasks may include tasks occurring at the estimators 318, at the controllers 320, at the mixer 322, and at the actuator controllers 324.

Each of the modules of the pipeline 310 (e.g., the drivers 312, the filters 314, the combine 316, the estimators 318, the controllers 320, the mixer 322, and the actuator controllers 324) may have a fixed execution time. A worst case completion time of a module may be calculated by taking its fixed execution time and adding execution times of each higher priority task multiplied by a ratio of frequency that the higher priority tasks run. In one example, a worst case completion time of a path in the pipeline 310 associated with a specific sensor 302 (e.g., a gyroscope sensor), may be, for example, 2 μs, and a worst case completion time of the controller 304 including the pipeline 310 may be, for example, 2.5 ms plus 6 μs. The ratio of the execution time of 2.5 ms of the controller 304 to an execution frequency of the specific sensor 302 of 1 ms. This may allow the specific sensor 302 to run up to 3 times for 2 μs each while the controller 304 is running. One the controller 304 starts running, the worst case it may complete execution may be 2.506 ms.

Execution time uses preemptive priority based schedules to have less time critical tasks execute after more time critical tasks.

Example Processing

Figure 6:
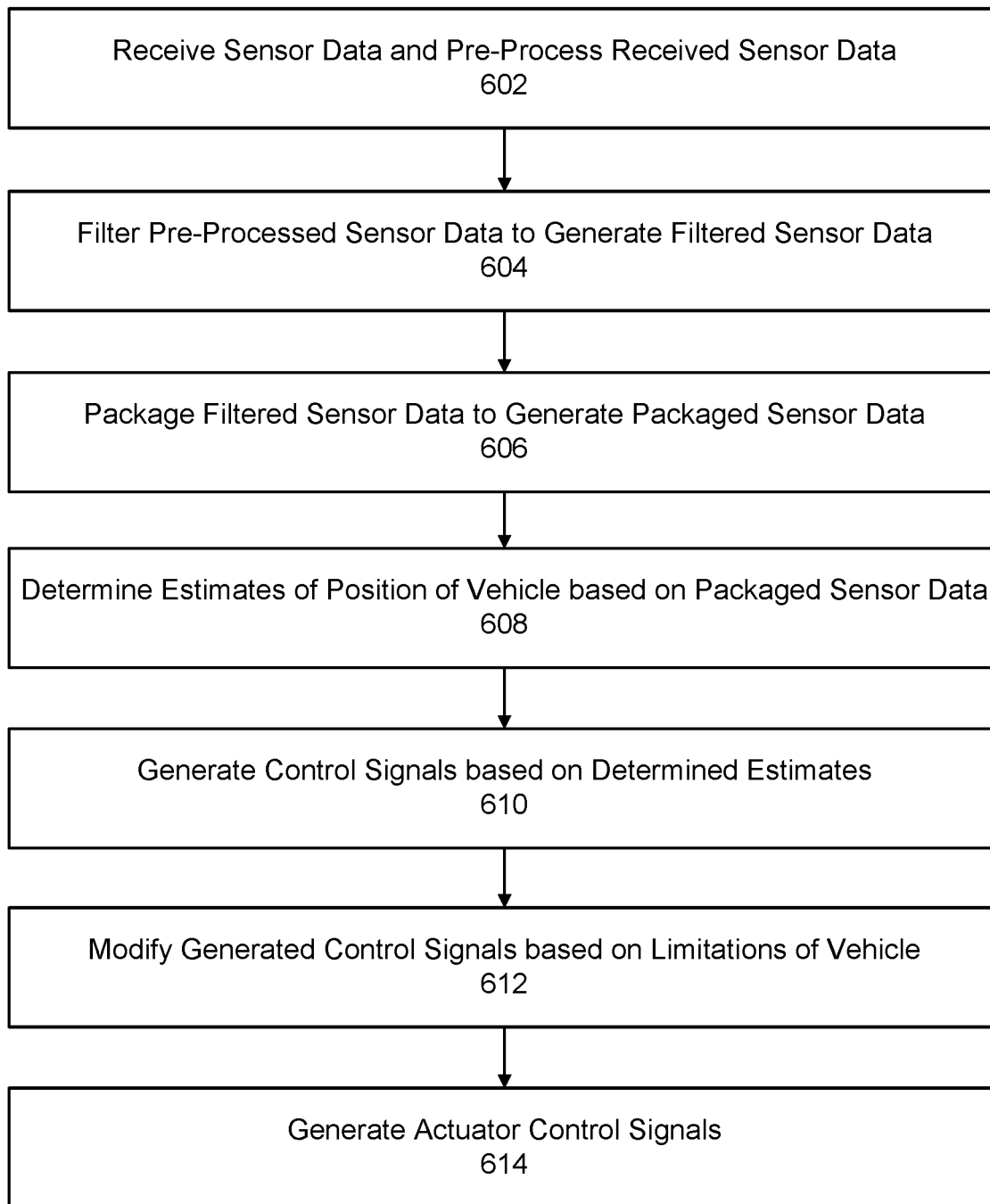
FIG. 6 illustrates a flow diagram of a method of processing sensor data to generate and execute commands, according to one example embodiment.

FIG. 6 illustrates a flow diagram of a method for processing sensor data to generate and execute commands, according to one example embodiment.

The drivers 312 receive 602 sensor data from the sensors 302 and pre-process 602 the received sensor data. In some configurations, the drivers 312 may receive 602 the sensor data from the sensors 302 responsive to sending a request to the sensors 302 for the sensor data. In some configurations, the drivers 312 may periodically receive 602 the sensor data from the sensors 302. The drivers 312 output the pre-processed sensor data.

The filters 314 filter 604 the pre-processed sensor data to generate filtered sensor data. The filters 314 may receive the pre-processed sensor data from the drivers 312. In some configurations, the filters 314 may filter 604 the pre-processed sensor data by downsampling, decimating, low-pass filtering, high-pass filtering, and band-pass filtering. The filters 314 may output the filtered sensor data.

The combine 316 packages 606 the filtered sensor data to generate packaged sensor data. In some configurations, the combine 316 may package 606 the filtered sensor data by combining the filtered sensor data for a period of time.

The estimators 318 determine 608 estimates of a position of a vehicle based on the packaged sensor data. In some configurations, the estimator 318 may determine 608 the estimates by estimating the vehicle's attitude information, altitude information, heading information, and absolute position relative to the earth.

The controllers 320 generate 610 control signals based on the determined estimates. For example, the controller 320A may generate 610 control signals that are transmitted to the mixer 322 whereas the other controllers (e.g., controller 320B, . . . , controller 320Y) may generate 610 control signals that are transmitted to a higher order controller. The controller 320A may generate 610 the control signals further based on control signals output from a lower order controller (e.g. controller 320B).

The mixer 322 modifies 612 the generated control signals based on limitations of the vehicle. In some configurations, the mixer 322 modifies 612 the generated control signals based on limitations of the actuator controllers 324. In some configurations, the mixer 322 is further configured to synchronously trigger each of the actuator controllers 324.

The actuator controllers 324 generate 614 actuator control signals based on the modified control signals. Each of the actuators 324 may be configured to output an actuator control signal at a same instance in time.

Example Machine Architecture

As has been noted, the remote controlled aerial vehicle 110 may be remotely controlled from the remote controller 120. The aerial vehicle 110 and the remote controller 120 are machines that may be configured and/or operated using software. FIG. 7 is a block diagram illustrating components of an example machine able to read instructions from a machine-readable medium (e.g., a non-transitory computer-readable storage medium) and execute them in one or more processors (or controllers). All or portions of the example machine described in FIG. 7 can be used with the aerial vehicle 110 or the remote controller 120 and/or other parts of a system that interfaces with the aerial vehicle 110 and/or remote controller 120. For example, the controller 304 including the pipeline 310 may be a part of the flight controller 215 of the aerial vehicle 110, and the flight controller 215 may be a machine/computer system similar to the example machine illustrated in FIG. 7.

In FIG. 7 there is a diagrammatic representation of a machine in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a handheld controller to control the remote controlled aerial vehicle. However, the architecture described may be applicable to other computer systems that operate in the system of the remote controlled aerial vehicle with camera and mounting configuration, e.g., in setting up a local positioning system. These other example computer systems include a server computer, a client computer, a personal computer (PC), a tablet PC, a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radiofrequency integrated circuits (RFICs), or any combination of these. The computer system 700 also includes a main memory 704. The computer system may include a storage unit 716. The processor 702, memory 704 and the storage unit 716 communicate via a bus 708.

In addition, the computer system 700 can include a static memory 706, a screen driver 710 (e.g., to drive screen, e.g., 170, such as a plasma display panel (PDP), a liquid crystal display (LCD), or a projector). The computer system 700 may also include input/output devices, e.g., an alphanumeric input device 712 (e.g., a keyboard), a dimensional (e.g., 2-D or 3-D) control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

A controller system including one or more modules organized into a pipeline may interface with one or more sensors and one or more actuators. Modules of the same type may execute in parallel while modules of different types may execute in sequence. Executing modules of the same type in parallel advantageously may enable a processing time of the system (e.g., the controller 304 including the pipeline 310) to be reduced by executing modules of the same type in parallel, and may further enable some of the modules to execute while others wait for one or more system resources. In one example, a multi-core architecture including two controllers (e.g., two controllers 304) in parallel may execute twice as fast if executed in parallel than in sequence. In another example, if two controllers (e.g., two controllers 304) are using a hardware action or a graphics processing unit (GPU) to execute vector instructions, then both of the controllers may take processing (or execution) time from one another while the other controller is pending on the hardware action. Organizing the modules of the controller system in the pipeline may advantageously enable the modules to take input synchronously from a preceding module and output one or more signals synchronously to a following module. In addition, the pipeline may advantageously enable each of the modules to have a constant execution time and thus the pipeline may have an overall constant execution time.

A preemptive priority based scheduler may be used to schedule an execution time for each module in the pipeline. Scheduling the execution time for each module may advantageously enable the controller to execute low priority tasks/modules without adversely affecting execution of high priority tasks/modules.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software (or program code)) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "one example embodiment," or "an embodiment" means that a particular element, feature, structure, or characteristic described in connection with the embodiment is included in at least one embodiment. The appearances of the phrase "in one embodiment" or "in one example embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative modules in a pipeline of a controller through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A controller for an unmanned aerial vehicle, comprising:
   a pipeline configured to interface between components of the unmanned aerial vehicle, wherein the pipeline includes elements including two or more of a driver, a filter, a combine, an estimator, a controller, or a mixer, wherein each of the elements receives inputs synchronously from a preceding element of the elements and generates outputs synchronously to a succeeding element of the elements; and
   a scheduler configured to schedule an execution time for each of the elements to provide a constant pipeline execution time, wherein the scheduler includes preemption and priority based scheduling such that lower priority tasks execute without adversely affecting an execution time of higher priority tasks.

2. The controller of claim 1, wherein the components include sensors and actuators of the unmanned aerial vehicle.

3. The controller of claim 2, wherein the elements comprise:
   one or more drivers configured to receive sensor data from the sensors and to pre-process the received sensor data to provide pre-processed sensor data;
   one or more filters configured to filter the pre-processed sensor data to provide filtered sensor data; and
   one or more combines configured to package the filtered sensor data to provide packaged sensor data.

4. The controller of claim 3, wherein each of the one or more drivers is configured to periodically receive the sensor data.

5. The controller of claim 3, wherein filtering the pre-processed sensor data includes at least one of downsampling, decimating, low-pass filtering, high-pass filtering, or band-pass filtering.

6. The controller of claim 3, wherein packaging the filtered sensor data includes combining the filtered sensor data for a period of time.

7. The controller of claim 3, wherein the elements further comprise:

one or more estimators configured to determine estimates of positional information of the unmanned aerial vehicle based on the packaged sensor data to provide determined estimates;

one or more controllers configured to generate control signals based on the determined estimates to provide generated control signals;

one or more mixers configured to modify the generated control signals based on settings of the unmanned aerial vehicle to provide modified control signals; and one or more actuator controllers configured to generate actuator control signals based on the modified control signals to drive the actuators.

8. The controller of claim 7, wherein the positional information includes at least one of attitude information, altitude information, heading information, or absolute position relative to the earth.

9. The controller of claim 7, wherein the one or more estimators comprise:

a first estimator configured to determine a first estimate of the positional information; and a second estimator configured to determine a second estimate of the positional information.

10. The controller of claim 9, wherein the one or more controllers comprise:

a low order controller configured to generate first control signals based on the first estimate; and a high order controller configured to generate second control signals based on the second estimate and the first control signals.

11. The controller of claim 7, wherein the one or more mixers is configured to modify the generated control signals based on limitations of the actuators.

12. The controller of claim 7, wherein the one or more mixers is configured to trigger each of the actuators synchronously.

13. The controller of claim 7, wherein each of the one or more actuator controllers is configured to output an actuator control signal of the actuator control signals at a same instance.

14. The controller of claim 1, further comprising:
a state machine configured to maintain a state of the pipeline.

15. An unmanned aerial vehicle, comprising:
one or more sensors;
one or more actuators;
a controller including a pipeline configured to interface between the one or more sensors and the one or more actuators,
wherein the pipeline includes two or more elements, and
wherein each of the two or more elements receives inputs synchronously from a preceding element of the two or more elements and generates outputs synchronously to a succeeding element of the two or more elements; and
a scheduler configured to schedule an execution time for each of the two or more elements to provide a constant pipeline execution time, wherein the scheduler includes preemption and priority based scheduling such that low priority tasks execute without adversely affecting an execution time of high priority tasks.

16. The unmanned aerial vehicle of claim 15, wherein the two or more elements comprise:

one or more drivers configured to receive sensor data from the one or more sensors and to pre-process the received sensor data to provide pre-processed sensor data;

one or more filters configured to filter the pre-processed sensor data to provide filtered sensor data;

one or more combines configured to package the filtered sensor data to provide packaged sensor data; and one or more estimators configured to determine estimates of positional information of the unmanned aerial vehicle based on the packaged sensor data to provide determined estimates.

17. The unmanned aerial vehicle of claim 16, further comprising:

one or more controllers configured to generate control signals based on the determined estimates to provide generated control signals;

one or more mixers configured to modify the generated control signals based on settings of the unmanned aerial vehicle to provide modified control signals; and one or more actuator controllers configured to generate actuator control signals based on the modified control signals to drive the one or more actuators.

18. A method executed by a controller in an unmanned aerial vehicle, the method comprising:

providing a pipeline with elements to interface between one or more sensors and one or more actuators of the unmanned aerial vehicle;

receiving inputs synchronously from a preceding element of the elements and generating outputs synchronously to a succeeding element of the elements; and scheduling an execution time for each element of the elements to provide a constant execution time, wherein the scheduling includes preemption and priority based scheduling such that lower priority tasks execute without adversely affecting an execution time of higher priority tasks.

19. The method of claim 18, further comprising:
pre-processing sensor data received from the one or more sensors to provide pre-processed sensor data;
filtering the pre-processed sensor data to provide filtered sensor data;
packaging the filtered sensor data to provide packaged sensor data; and
determining estimates of positional information of the unmanned aerial vehicle based on the packaged sensor data to provide determined estimates.

20. The method of claim 19, further comprising:
generating control signals based on the determined estimates to provide generated control signals;
modifying the generated control signals based on settings of the unmanned aerial vehicle to provide modified control signals; and
generating actuator control signals based on the modified control signals to drive the one or more actuators.

* * * * *